United States Patent
Meganathan et al.

(10) Patent No.: US 10,057,715 B1
(45) Date of Patent: Aug. 21, 2018

(54) SYSTEMS AND METHODS FOR SELECTING AN OPTIMAL DEVICE IN A HOME SECURITY OR AUTOMATION SYSTEM FOR PRESENTING A NOTIFICATION OR ALERT

(71) Applicant: Honeywell International Inc., Morristown, NJ (US)

(72) Inventors: Deepak Sundar Meganathan, Bangalore (IN); Shankar Prasad H M, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/473,072

(22) Filed: Mar. 29, 2017

(51) Int. Cl.
G08B 25/10 (2006.01)
H04W 4/20 (2018.01)
H04W 4/02 (2018.01)
H04L 29/08 (2006.01)

(52) U.S. Cl.
CPC ............ *H04W 4/023* (2013.01); *G08B 25/10* (2013.01); *H04L 67/26* (2013.01); *H04W 4/20* (2013.01)

(58) Field of Classification Search
CPC ..... H04W 4/021; H04W 4/023; H04W 4/043; G01C 21/34; G06Q 30/0639; H04M 3/5315; H04N 21/25825; H04N 21/42203; H04N 21/4223; H04N 2201/0094
See application file for complete search history.

(56) References Cited

U.S. PATENT DOCUMENTS

| | | | |
|---|---|---|---|
| 7,284,046 B1 * | 10/2007 | Kreiner | H04L 67/303 455/414.1 |
| 8,380,226 B2 | 2/2013 | Clipsham | |
| 8,554,897 B2 | 10/2013 | Kim et al. | |
| 8,560,497 B2 | 10/2013 | Choi et al. | |
| 9,208,676 B2 | 12/2015 | Fadell et al. | |
| 9,250,085 B2 * | 2/2016 | Hwang | G08B 25/10 |
| 2010/0217816 A1 * | 8/2010 | Smelyansky | H04L 51/066 709/206 |
| 2011/0145159 A1 * | 6/2011 | Wilson | G06Q 10/06 705/313 |
| 2012/0195325 A1 * | 8/2012 | Connelly | H04L 12/5855 370/432 |
| 2012/0316843 A1 * | 12/2012 | Beno | G06Q 10/0639 703/2 |

(Continued)

FOREIGN PATENT DOCUMENTS

EP 2 485 162 A1 8/2012
JP 2015-215737 A 12/2015

OTHER PUBLICATIONS

English language translation for JP2015215737A.

*Primary Examiner* — Fekadeselassie Girma
(74) *Attorney, Agent, or Firm* — Husch Blackwell LLP

(57) ABSTRACT

Systems and methods for selecting an optimal device in a home security or automation system for presenting a notification or an alert are provided. Some methods can include identifying notification capabilities of a plurality of system devices installed in a region, detecting an occurrence of an event, identifying a location of a user within the region, and identifying at least one of the plurality of system devices that includes one of the notification capabilities for presenting the notification of the occurrence of the event and that is within a predetermined distance of the location of the user.

16 Claims, 1 Drawing Sheet

(56) References Cited

U.S. PATENT DOCUMENTS

| | | | |
|---|---|---|---|
| 2013/0331087 A1* | 12/2013 | Shoemaker | H04L 67/125 |
| | | | 455/420 |
| 2014/0036299 A1* | 2/2014 | Norota | G06F 3/121 |
| | | | 358/1.14 |
| 2014/0317523 A1 | 10/2014 | Wantland et al. | |
| 2014/0337127 A1* | 11/2014 | Morel | G06Q 30/0251 |
| | | | 705/14.49 |
| 2014/0358981 A1* | 12/2014 | Miyake | H04L 67/1095 |
| | | | 709/201 |
| 2015/0098553 A1* | 4/2015 | Bonitati | H04M 3/5116 |
| | | | 379/45 |
| 2015/0163412 A1 | 6/2015 | Holley et al. | |
| 2015/0244681 A1* | 8/2015 | Blumenfeld | H04L 63/0421 |
| | | | 713/168 |
| 2015/0302858 A1* | 10/2015 | Hearing | G10L 19/00 |
| | | | 381/58 |
| 2016/0133120 A1* | 5/2016 | Reibel | G08B 25/008 |
| | | | 340/506 |
| 2016/0182556 A1* | 6/2016 | Tatourian | G06F 21/554 |
| | | | 726/25 |
| 2016/0217381 A1* | 7/2016 | Bloomquist | G06N 5/02 |
| 2016/0261822 A1* | 9/2016 | Matsuura | H04N 7/0117 |
| 2017/0061525 A1* | 3/2017 | McCoy | G06Q 30/0639 |
| 2017/0124259 A1* | 5/2017 | Kotturu | G06F 19/322 |
| 2017/0148467 A1* | 5/2017 | Franklin | G10L 25/51 |
| 2017/0154518 A1* | 6/2017 | Prabhakar | G08B 21/12 |

\* cited by examiner

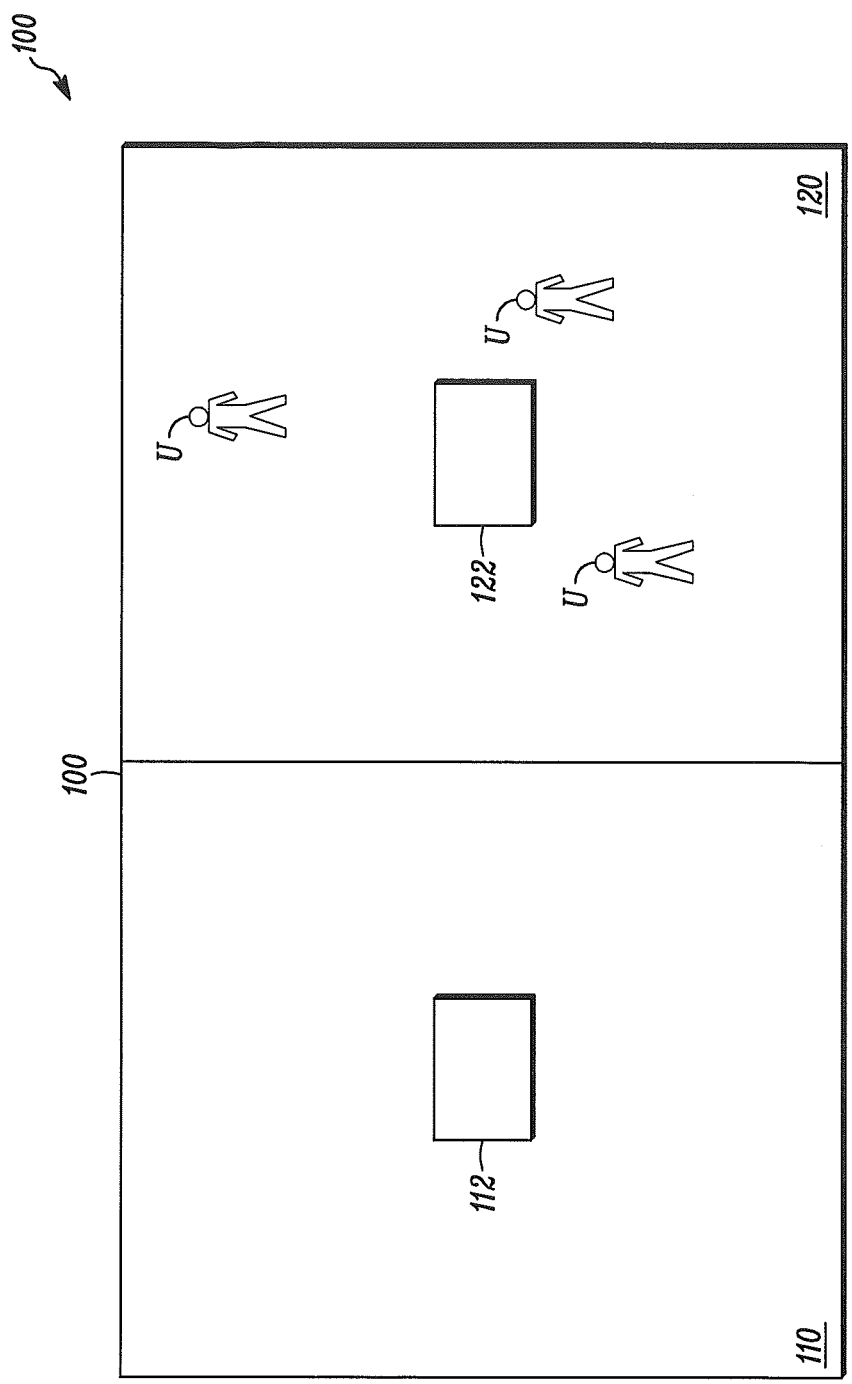

SYSTEMS AND METHODS FOR SELECTING AN OPTIMAL DEVICE IN A HOME SECURITY OR AUTOMATION SYSTEM FOR PRESENTING A NOTIFICATION OR ALERT

FIELD

The present invention relates generally to home security systems and home automation systems. More particularly, the present invention relates to systems and methods for selecting an optimal device in a home security or automation system for presenting a notification or alert.

BACKGROUND

In known home security systems and home automation systems, notifications received by a system are pushed to a control panel of the system, a system device, and/or a user's mobile device executing a mobile application in connection with the system. However, known systems do not use capabilities of system devices or a location of the user in a home as factors in determining where and how to present such notifications.

For example, known systems and methods do not identify the location of the user in the home before pushing a notification to the control panel, the system device, or the user's mobile device. Therefore, known systems and methods do not know when the user is outside of a room in which the notification is presented.

Furthermore, the system devices in known home security systems and home automation systems have different capabilities. For example, different system devices include a speaker or other audio capabilities, a display screen, an LED, a buzzer, a motor, a touch screen, and the like. However, known systems and methods do not identify the capabilities of the system devices before pushing the notification to the system. Therefore, known systems and methods may not present the notification in the most optimal manner available.

Further still, known mobile applications that are executed on the user's mobile device in connection with known home security systems and home automation systems do not present the notifications to the user based on the user's location.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for selecting an optimal device in a home security or automation system for presenting a notification or an alert. For example, systems and methods disclosed herein can select the optimal device for presenting the notification or the alert based on a user's location in a home and based on capabilities of system devices.

Systems and methods disclosed herein are described and disclosed in connection with notifications and alerts. However, it is to be understood that systems and methods disclosed herein can also be used in connection with voice or audio messages received from an operator at a central monitoring station.

In some embodiments, systems and methods disclosed herein can identify and track the location of all users associated with the home, both inside and outside of the home, based on the users' mobile devices or wearable devices. For example, systems and methods disclosed herein can use location management data, such as GPS data, geo-fencing data, indoor location sensing data, proximity sensing data, occupancy sensing data, and the like, to identify the location of the users. Additionally or alternatively, in some embodiments, systems and methods disclosed herein can identify and track the location of the users inside of the home based on sensing or detecting the users or activities of the users, for example, via location sensing devices, such as a PIR motion detector, a camera, a microphone, or a BLE tag with a known location inside of the home. In some embodiments, the BLE tag can be installed in or on the system devices as described and disclosed herein to facilitate identifying the location of the users relative to the system devices.

In accordance with disclosed embodiments, after the home security or automation system is installed and configured in the home, systems and methods disclosed herein can identify the capabilities of all of the system devices. For example, the system devices can include any connected IoT device, such as, for example, motion sensors, door locks, cameras, thermostats, window blind and shade controls, lighting devices and bulbs, HVAC controllers and sensors, door, window, and garage status sensors and locks, control panels, keypads, music systems, gateway devices, smoke, fire, gas, and flood detectors, sprinkler devices, air purifier devices, speakers, televisions, door phone receivers, plug and binary switches, key fobs, water valves, sirens, door bells, washing machines, coffee makers, dishwashers, and the like. The capabilities of the system devices that can be identified can include whether a particular device includes a display screen, a microphone, a speaker, a buzzer, a camera, an LED, a battery, a hard-wired power connection, a motor, a touch sensor or screen, a memory device, an ambient sensor, and the like and an identification of a communication medium and protocol for the particular device, such as RF, GSM, IP, WiFi, CDMA, Ethernet, Bluetooth, cellular, and Z-wave. Some of the system devices can have similar capabilities. For example, each of a speaker, a smoke detector, and an air purifier device can include a microphone, a speaker, or a buzzer to emit a sound or a beep, and each of a thermostat, a keypad, a music system, a television, and a door phone receiver can include a display screen. All of the system devices can include an LED.

In some embodiments, the capabilities of the system devices that are identified can be stored in a database device, and in some embodiments, systems and methods disclosed herein can cross-reference the capabilities of the system devices identified in the database with types of notifications or alerts that can be pushed to the system devices. For example, systems and methods can cross-reference a first type of event, such as a door unlock event, with the system devices that can provide the notification of the first type of event, such as a door bell, a speaker, a thermostat display screen or buzzer, and the like.

In accordance with the above, when systems and methods detect the first type of event, systems and methods disclosed herein can identify a current location of the user in the home, identify a plurality of optimal devices that includes the user's mobile device or the system devices that can provide a the notification of the first type of event and that are within a predetermined distance from the current location of the user, and push the notification of the first type of event to the plurality of optimal devices identified. Accordingly, it can be understood that systems and methods disclosed herein can push the notifications of events to more than one device. As systems and methods disclosed herein receive status information associated with the system devices, systems and methods disclosed herein can update the database device so that the system devices identified that can provide the notifications of a certain type are based on the most current information available.

In some embodiments, the system devices that include a first type of capability, such as a buzzer or an LED, can be configured to provide or emit a first type of notification, such as a single beep or a blinking light with a single interval, responsive to receiving the notification of the first type of event and to provide a second type of notification, such as a constant beep or a constant illumination, responsive to receiving the notification of a second type of event.

In some embodiments, the system device can provide or emit the notification personalized or specific to an event that triggered the notification. For example, when a door lock detects the door unlock event, the door lock can determine that User A unlocked the door lock based on a pin code entered into the door lock or based on the location of User A's mobile device relative to the door lock. Then, the optimal system device identified can provide or emit the notification indicative of the door unlock event and indicative of the fact that User A unlocked the door lock.

In some embodiments, systems and methods disclosed herein can identify an exception for one of the system devices so that the notification is pushed to the one of the system devices as a default setting and regardless of any identified capabilities of the one of the system devices.

FIG. 1 is a block diagram of a system 100 in accordance with disclosed embodiments. As seen in FIG. 1, the system can include a building 100, such as a home, with a first monitored region 110 that includes a first system device 112 and a second monitored region 120 that includes a second system device 122.

In some embodiments, the first monitored region 110 can include a kitchen, and the first monitored device 112 can include a sensor that detects a glass break alarm event in the region 110. The second monitored region 120 can include a living room, and the second monitored device 122 can include a television. Systems and methods disclosed herein can identify a location of all users U in the building 100 as being in the region 120 and can notify the users U of the glass break alarm event by pushing visual and/or audio alert notifications to the device 122, which can be seen and/or heard by the users U in the region 120 and nearby the device 122.

Additionally or alternatively, in some embodiments, the first monitored region 110 can include a garage, and the first monitored device 112 can include a sensor that detects a garage door open event in the region 110. The second monitored region 120 can include the kitchen, and the second monitored device 122 can include a smoke detector. Systems and methods disclosed herein can identify the location of a user U in the building 100 as being in the region 120 and can notify the user U of the garage door open event by pushing an audio alert notification to the device 122, which can be heard by the user U in the region 120 and nearby the device 122. In some embodiments, if the smoke detector 122 is emitting a first sound when the detector 122 receives the audio alert notification regarding the garage door open event, then the detector 122 can emit a second, different sound to signify the audio alert notification regarding the garage door open event.

Additionally or alternatively, in some embodiments, the first monitored region 110 can include a doorway, and the first monitored device 112 can include a door lock that can detect a door unlock event in the region 110. The second monitored region 120 can include the kitchen, and the second monitored device 122 can include a thermostat with a display screen. Systems and methods disclosed herein can identify the location of the users U in the building 100 as being in the region 120 and can notify the users U of the door unlock event by pushing a visual alert notification to the device 122, which can be seen on the display screen by the users U in the region 120 and nearby the device 122. In some embodiments, the display screen of the device 122 can display text regarding the door unlock event or can display a color indicative of the door unlock event. For example, blinking an orange light on the display screen can indicate a door event, but blinking a red light on the display screen can indicate a security event. In some embodiments, the device 122 can display the visual alert notification for a predetermined period of time after which the display screen of the device 122 can display its default view.

It is to be understood that systems and methods as disclosed and described above can be implemented with a transceiver device and a memory device in communication with control circuitry, one or more programmable processors, and executable control software as would be understood by one of ordinary skill in the art. In some embodiments, the transceiver device can communicate with system devices and user's mobile devices, and in some embodiments, the memory device can store identified capabilities of the system devices cross-referenced with types of notifications or alerts that can be pushed to the system devices. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processors, and the executable control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   identifying respective notification capabilities of each of a plurality of system devices installed in a region;

detecting an occurrence of an event;
identify an associated type of the event;
identifying a location of a user within the region;
identifying at least one of the plurality of system devices where the respective notification capabilities include a capability for presenting a notification type corresponding to the associated type of the event and that is within a predetermined distance of the location of the user; and
transmitting a first signal indicative of the occurrence of the event to the at least one of the plurality of system devices to present the notification type corresponding to the associated type of the event.

2. The method of claim 1 wherein detecting the occurrence of the event includes detecting an ambient condition, detecting a change of state of any of the plurality of system devices, or receiving a message from a central monitoring station.

3. The method of claim 1 wherein identifying the location of the user within the region includes using location management data associated with a mobile device or a wearable device of the user to identify the location of the user or a location sensing device in the region detecting a presence of the user.

4. The method of claim 1 wherein the plurality of system devices includes connected Internet of Things devices.

5. The method of claim 1 wherein the respective notification capabilities of each of the plurality of system devices include respective features of a respective one of the plurality of system devices for presenting the notification type corresponding to the associated type of the event or respective communication mediums for communication with the respective one of the plurality of system devices.

6. The method of claim 1 further comprising:
storing a record of the respective notification capabilities of each of the plurality of system devices in a database device; and
identifying the at least one of the plurality of system from the record in the database device.

7. The method of claim 6 wherein the record includes a cross-reference between the respective notification capabilities of each of the plurality of system devices, a plurality of types of events, and a plurality of notification types.

8. The method of claim 1 further comprising:
identifying a default one of the plurality of system devices; and
transmitting a second signal indicative of the occurrence of the event to the default one of the plurality of system devices regardless of the respective notification capabilities of the default one of the plurality of system devices and regardless of the location of the user.

9. A system comprising:
a transceiver device;
a programmable processor; and
executable control software stored on a non-transitory medium,
wherein the programmable processor and the executable control software identify respective notification capabilities of each of a plurality of system devices installed in a region,
wherein the programmable processor and the executable control software detect, via the transceiver device, an occurrence of an event,
wherein the programmable processor and the executable control software identify an associated type of the event,
wherein the programmable processor and the executable control software identify, via the transceiver device, a location of a user within the region,
wherein the programmable processor and the executable control software identify at least one of the plurality of system devices where the respective notification capabilities include a capability for presenting a notification type corresponding to the associated type of the event and that is within a predetermined distance of the location of the user, and
wherein the programmable processor and the executable control software transmit, via the transceiver device, a first signal indicative of the occurrence of the event to the at least one of the plurality of system devices to present the notification type corresponding to the associated type of the event.

10. The system of claim 9 wherein the programmable processor and the executable control software detect the occurrence of the event by detecting, via a sensor and the transceiver device, an ambient condition or a change of state of any of the plurality of system devices or by receiving, via the transceiver device, a message from a central monitoring station.

11. The system of claim 9 wherein the programmable processor and the executable control software identify the location of the user within the region by receiving location management data associated with a mobile device or a wearable device of the user or by receiving a second signal from a location sensing device in the region detecting a presence of the user.

12. The system of claim 9 wherein the plurality of system devices includes connected Internet of Things devices.

13. The system of claim 9 wherein the respective notification capabilities of each of the plurality of system devices include respective features of a respective one of the plurality of system devices for presenting the notification type corresponding to the associated type of the event or respective communication mediums for communicating with the respective one of the plurality of system devices.

14. The system of claim 9 further comprising:
a database device,
wherein the programmable processor and the executable control software store a record of the respective notification capabilities of each of the plurality of system devices in the database device, and
wherein the programmable processor and the executable control software identify the at least one of the plurality of system devices from the record in the database device.

15. The system of claim 14 wherein the record includes a cross-reference between the respective notification capabilities of each of the plurality of system devices, a plurality of types of events, and a plurality of notification types.

16. The system of claim 9 wherein the programmable processor and the executable control software identify a default one of the plurality of system device and transmit a second signal indicative of the occurrence of the event to the default one of the plurality of system devices regardless of the respective notification capabilities of the default one of the plurality of system devices and regardless of the location of the user.

* * * * *